2,910,410
MICROBIOLOGICAL FERMENTATION PROCESS

Julian Corman, Muscatine, Iowa, assignor to Grain Processing Corporation, Muscatine, Iowa, a corporation of Iowa No Drawing. Application January 13, 1958
Serial No. 708,350

11 Claims. (Cl. 195—81)

This invention relates to microbiological fermentation processes and more particularly to an improved process for the production of beta-carotene by microbiological fermentation.

The production of beta-carotene by the aerobic cultivation of microorganisms such as those of the genera Blakeslea and Choanephora is well known in the art. However, it has been noted that the cultivation of these microorganisms in various liquid nutrient media is accompanied by a strong tendency to form clumps or mycelial mats during the growth or proliferation period. The clumping or matting of the mold mycelium invariably occurs even when precautions are taken to eliminate such problems. The precautions which have been considered to prevent this clumping phenomenon are the use of agitation such as may be provided in the laboratory by reciprocal type or rotary agitators.

One particularly important disadvantage of clumping of the microorganisms is that the product resulting from the cultivation is not amenable to simple aseptic transfer for purposes of inoculation which would be required in the withdrawal of aliquot portions of the beta-carotene culture for such purposes wherein it is desirable that the medium be homogeneous such as in the preparation of a beta-carotene fermentation inoculum.

Another disadvantage of this clumping tendency is that the microorganisms within the colonies or clumps are substantially out of physical contact with the nutrient medium and therefore cannot efficiently utilize the nutrients to produce the desired beta-carotene product. Of course, the end result of this latter difficulty is a low yield of beta-carotene.

Many expedients have been proposed to diminish this clumping of the aforementioned microorganisms, some of which include severe agitation accompanied by the introduction of sterilized ceramic objects maintained in the medium for the purpose of disintegrating the mycelial growth as it forms. All of these methods have been futile in the elimination of the difficulty.

It has also been proposed to utilize surface active agents in conjunction with the medium to provide a more disperse culture, but such use of surface active agents is not entirely satisfactory. The primary difficulty with the use of such material is that many surface active agents are toxic to the aforementioned microorganisms and accordingly detrimental to their growth and consequent production of beta-carotene. Furthermore, the use of surface active agents represents a costly expedient quite often beyond the practical range of commercial operation.

Accordingly it is one object of the present invention to provide an improved process for the production of beta-carotene which has yields superior to those obtained by the methods of the prior art.

Another object is the provision of an improved process for the production of beta-carotene which eliminates the problem of clumping or formation of mycelial mats during cultivation.

A still further object is the provision of a process for the production of a beta-carotene fermentation inoculum in which the mold mycelium is uniformly dispersed throughout the nutrient medium and in which the necessity for the use of surface active agents is eliminated.

A still further object is the provision of an improved process for the production of beta-carotene from microorganisms of the genus Blakeslea or Choanephora in a liquid medium which provides for uniform growth of the latter homogeneously throughout said medium.

These and other objects of the present invention will be seen from the following specification, examples, and appended claims.

Accordingly, in one broad form the present invention includes an improved process for the production of beta-carotene which comprises inoculating a sufficiently viscous liquid nutrient medium with a beta-carotene producing microorganism or microorganisms so as to produce a disperse culture of said microorganism during growth or proliferation. The specific microorganisms contemplated herein are those selected from the group of microorganisms of the genera Blakeslea and Choanephora. Exemplary of such microorganisms are cultures of *Blakeslea trispora* and *Choanephora circinans* which are on deposit at the Northern Utilization Research and Development Division of the Agricultural Research Service of the United States Department of Agriculture in Peoria, Illinois. Broadly the fermentations of the present invention are carried out under aerobic conditions. It is contemplated that the fermentation may be carried out with agitation such as may be provided by reciprocal or rotary shakers as are well known in the art. In large scale commercial operations the aerobic conditions may be furnished by sparging air through the growth medium maintained in large tanks or vats. The viscosity of the medium for the purposes of the process of the present invention should at least be sufficiently high to prevent clumping or matting of the mold mycelia during the incubation or growth preiod, and more specifically should be maintained at a value of at least about 600 centipoises, and preferably above about 1000 centipoises. It has been found that this high viscosity value will provide a growth medium in which the clumping or matting tendency of the aforementioned microorganisms is eliminated and thus produces a uniform dispersion of the microorganisms throughout the liquid nutrient solution. It has also been found that use of the nutrient solution whose relative viscosity is above the minimum viscosity value results in efficient utilization of the nutrients and enhanced yields of the desired beta-carotene product.

Of course, while the use of liquid nutrient media characterized by these high viscosity levels is beneficial in the production of beta-carotene as described above, it should be understood that maximum yields of beta-carotene are achieved by the use in the process of the present invention of a substrate which is nutritionally adequate for the rapid growth of the microorganisms. It should be mentioned that this invention is primarily concerned with liquid nutrient media and particularly those of an aqueous nature.

The adjustment of the relative viscosity to the desired values may be accomplished by various means. For example, various nutrient thickening substances may be utilized as thickening agents and additionally provide the desired viscosity. Nutrient thickening agents, such as carbohydrates and proteinaceous substances, are quite useful in the present improved process. Exemplary of carbohydrates which may be utilized are broadly starches including gelatinized starches, dextrin, dextran, levan and other polysaccharides. Nutrient proteinaceous substances which provide the necessary thickening and resultant high viscosity levels are distiller's solubles, gluten, soybean flour, corn steep liquor, fish stick liquor, gelatin, glue, cottonseed meal, peanut meal, linseed meal, and the like. It is likewise a part of the present invention that various nutritionally inert and nontoxic thickening agents may also be utilized in the present process to produce the requisite viscosity levels. For example, substances such as carboxymethyl cellulose, polyvinyl pyrrolidone, agar, gum tragacanth, gum acacia, similar gums and water soluble synthetic resins and the like are useful.

Generally it should be stated that the thickening of the growth medium to the desired viscosity levels may be accomplished by the use of several of the aforementioned classes of thickening agents in various combinations.

As has been indicated above, the viscosity levels which have been found to be necessary to produce the desired disperse growth of the mold mycelium and optimum yields of beta-carotene have been above 600 centipoises, and usually above 1000 centipoises. Viscosity levels as high as 30,000 centipoises and all intermediate values in the above indicated range are also useful.

The following experiments will serve to illustrate specific embodiments of the improved process of the present invention:

EXAMPLE 1

One hundred milliliters of distiller's solubles syrup containing 5 percent solids and adjusted to pH 5.50 were added to duplicate 500 milliliter Erlenmeyer flasks containing 0, 1, 2 and 5 grams starch, respectively, as well as 0.1 gram yeast extract and 4 milliliter cottonseed oil. The flasks were then plugged in the usual manner and autoclaved at 250° F. for thirty minutes. After cooling to room temperature, the medium in each flask was inoculated with 3 milliliters of a twenty-four hour culture of *Blakeslea trispora* NRRL 2456 and 3 milliliters of a twenty-four hour culture of *Blakeslea trispora* NRRL 2457. The flasks were then agitated at 200 r.p.m. on a Gump type rotary shaker at 28° C. for forty-eight hours when 0.1 percent sterile beta-ionone was added aseptically to each flask. After further incubation on the rotary shaker for a total of six days, mycelial growth appeared as one large lump in each of the culture flasks containing medium supplemented with 0, 1 and 2 percent starch, whereas mycelial growth was finely dispersed in the duplicate culture flasks containing the same basal medium supplemented with 5 percent starch. To show that the mycelial mats formed in low starch media were unable to carry out the desired chemical reactions efficiently, all cultures were assayed at six days for beta-carotene. The average yield of beta-carotene per 100 milliliter duplicate cultures along with the initial relative viscosities of the media prior to inoculation are noted in Table 1.

Table 1

| Distiller's solubles, percent | Starch, percent | Relative viscosity, centipoises | Micrograms beta-carotene per 100 ml. culture | Type of growth |
|---|---|---|---|---|
| 5 | 0 | 45 | 1,162 | 1 lump. |
| 5 | 1 | 87 | 2,222 | Do. |
| 5 | 2 | 206 | 1,659 | Do. |
| 5 | 5 | 1,312 | 32,595 | Disperse. |

The increased yield of beta-carotene in the duplicate dispersed cultures wherein the medium was supplemented with 5 percent starch used to attain sufficiently high relative viscosity levels is obvious. All cultures containing from 1 to 5 percent starch gave a blue starch iodine reaction after six days' incubation indicating that even 1 percent starch is in excess of metabolic requirements.

EXAMPLE 2

The viscosities of the media cited in Example 1 may also be increased by additional protein solids originating from the distiller's solubles syrup. Therefore the experiment cited in Example 1 was duplicated except that the distiller's solubles syrup solids was increased to 10 percent. This concentration of protein solids increased the viscosities of the media so that disperse mycelial growth was obtained in all flasks including the duplicate flasks that did not contain starch. The yields of beta-carotene after six days' incubation on the Gump shaker along with initial relative viscosities of the media prior to inoculation are shown in Table 2.

Table 2

| Distiller's solubles, percent | Starch, percent | Relative viscosity, centipoises | Micrograms beta-carotene per 100 ml. culture | Type of growth |
|---|---|---|---|---|
| 10 | 0 | 640 | 1,402 | Disperse. |
| 10 | 1 | 1,220 | 60,245 | Do. |
| 10 | 2 | 2,520 | 52,187 | Do. |
| 10 | 5 | 28,000 | 38,930 | Do. |

EXAMPLE 3

One hundred milliliters of distiller's solubles syrup, adjusted to pH 7.0 and having a solids content of 6 percent was added to each of four 500 milliliter Erlenmeyer flasks containing 3 milliliters soybean oil. One gram of starch was added to the media in the first set of duplicate flasks, while 2 grams carboxymethylcellulose was added to the media in the second set of duplicate flasks. After the media were autoclaved at 250° F. for thirty minutes and cooled to room temperature, they were inoculated with 3 milliliters of a twenty-four hour submerged culture of *Blakeslea trispora* NRRL 2456, and 3 milliliters of a twenty-four hour submerged culture of *Blakeslea trispora* NRRL 2457 and incubated at 28° C. on a rotary shaker. One-tenth milliliter of sterile beta-ionone was added aseptically to the medium in each flask at 48 hours and incubation continued on the rotary shaker for a total of six days when all cultures were assayed for beta-carotene. The average beta-carotene yield in duplicate flasks along with initial viscosities of the media are noted in Table 3.

Table 3

| Distiller's solubles, percent | Starch, percent | Carboxymethyl cellulose, percent | Relative viscosity, centipoises | Micrograms beta-carotene per 100 ml. culture | Type of Growth |
|---|---|---|---|---|---|
| 6 | 1 |  | 380 | 1,140 | 1 lump. |
| 6 |  | 2 | 3,400 | 17,100 | Disperse. |

EXAMPLE 4

Three milliliters of a twenty-four hour submerged culture of *Choanephora circinans* NRRL 2546, and 3 milliliters of a twenty-four hour submerged culture of *Choanephora circinans* NRRL 2548 were used to inoculate duplicate flasks of autoclaved and cooled medium composed of 10 percent distiller's solubles syrup solids, 1 percent starch and 2 percent cottonseed oil and 2 percent soybean oil. The relative viscosity of the medium prior to inoculation was 1220 centipoises. After 48 hours' incubation at 28° C. on the Gump shaker, 0.1 percent sterile beta-ionone was added asceptically and incubation was continued on the Gump shaker for a total of 6 days, when a yield of 3555 micrograms beta-carotene per 100 milliliter culture was attained. The mycelial growth was dispersed during the entire fermentation period.

While the foregoing examples have been illustrative of specific species of the microorganisms of the herein claimed process, it is also true that other species of the microorganisms of the genera Blakeslea and Choanephora may be utilized to advantage.

Although various specific strains of certain species have been indicated as useful, other strains are also considered as a part of the present invention.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. An improved process for the production of beta-carotene which comprises inoculating a nutrient culture medium with a microorganism selected from the group consisting of genus Blakeslea and genus Choanephora, adjusting the viscosity of the medium to a value of at least 600 centipoises to maintain the growth of said microorganism dispersed throughout the same, and incubating said inoculated medium under aerobic conditions to produce beta-carotene.

2. A process for the production of beta-carotene which comprises inoculating a liquid nutrient medium with a micro-organism selected from the group consisting of genus Blakeslea and genus Choanephora, said medium having a viscosity value of at least 600 centipoises, and incubating the resulting culture with agitation under aerobic conditions to produce beta-carotene.

3. The process of claim 2 wherein the adjustment of viscosity is carried out by the addition of a nutrient carbohydrate thickening agent.

4. The process of claim 3 wherein the thickening agent is gelatinized starch.

5. The process of claim 2 wherein the adjustment of viscosity is carried out by the addition of a nutrient proteinaceous thickening agent.

6. The process of claim 5 wherein the nutrient proteinaceous thickening agent is distiller's solubles.

7. The process of claim 2 wherein the adjustment of viscosity is carried out by the addition of carboxymethyl cellulose.

8. A process for the production of beta-carotene which comprises inoculating a nutrient substrate (having an initial viscosity value of at least 600 centipoises) with a microorganism of the genus Blakeslea, and incubating said culture with agitation under aerobic conditions.

9. A process for the production of beta-carotene which comprises inoculating a nutrient substrate (having an initial viscosity of at least 600 centipoises) with a microorganism of the genus Choanephora, and incubating said culture with agitation under aerobic conditions.

10. A process for the production of beta-carotene which comprises cultivating under aerobic conditions a microorganism selected from the group consisting of genus Blakeslea and genus Choanephora in a liquid nutrient substrate having an initial viscosity between about 1000 and 30,000 centipoises.

11. A process for the production of beta-carotene which comprises cultivating under aerobic conditions a microorganism selected from the group consisting of the genus Blakeslea and the genus Choanephora in a liquid nutrient substrate having a viscosity in excess of about 600 centipoises.

References Cited in the file of this patent

Barnett et al.: Science, January 27, 1956, "Increased Production of Carotene by Mixed + and − Cultures of *Choanephora cucurbitarum*," page 141.